United States Patent

[11] 3,548,951

[72] Inventors George E. Weasel, Jr.;
　　　　　　　Harold W. Weimer, McClure, Ohio
[21] Appl. No. 762,176
[22] Filed Sept. 16, 1968
[45] Patented Dec. 22, 1970
[73] Assignee Tem-Cole, Inc.
　　　　　　　McClure, Ohio
　　　　　　　a corporation of Ohio

[54] MULTIPLE ROW CROP HARVESTING MACHINE
　　　9 Claims, 4 Drawing Figs.
[52] U.S. Cl. ................................................... 171/61, 56/20
[51] Int. Cl. ..................................................... A01d 17/10
[50] Field of Search ......................................... 56/1, 10, 15, 20, 21, 40, 41; 171/9, 61; 172/103

[56] References Cited
UNITED STATES PATENTS

| | | | |
|---|---|---|---|
| 2,833,358 | 5/1958 | Lust | 171/61 |
| 2,986,861 | 6/1961 | Hubbard | 56/41 |
| 3,005,303 | 10/1961 | Hubbard | 171/9X |
| 3,093,946 | 6/1963 | Pitt et al. | 56/20 |

Primary Examiner—Antonio F. Guida
Attorney—Owen & Owen

ABSTRACT: A harvesting machine for the simultaneous harvesting of a plurality of parallel, spaced-apart rows of crops. The machine includes a plurality of separate harvesting mechanisms mechanically driven by a plurality of hydraulic fluid motors whose output torque is proportional to the pressure of the hydraulic fluid supplied thereto. A source of hydraulic fluid under a predetermined constant pressure is connected to the fluid motors by fluid supply and return lines to provide a closed hydraulic system with a pressure responsive bypass valve positioned in the supply lines and effective to bypass hydraulic fluid around said motors when the pressure on said valve exceeds said predetermined constant pressure. When one of said harvesting mechanisms encounters a load, such as an obstruction, which exceeds the output torque of its associated motor, the consequent pressure increase in said fluid supply line will open said bypass valve to effectively stop said motors and their harvesting mechanisms until said obstruction is removed. The machine may further include remotely operable override means for opening said bypass valve and separate sources of motive power for said hydraulic pressure source and said harvesting machine.

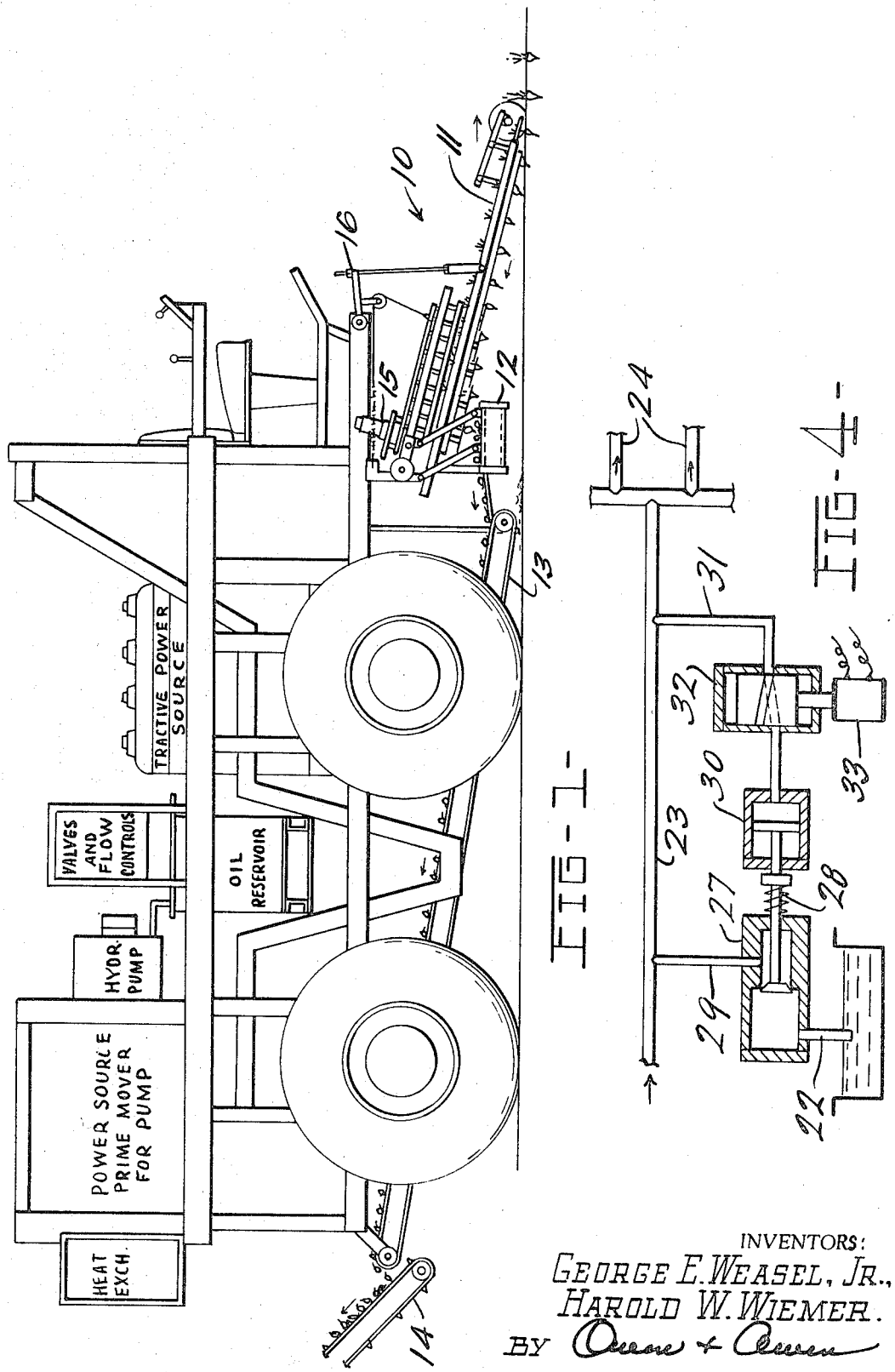

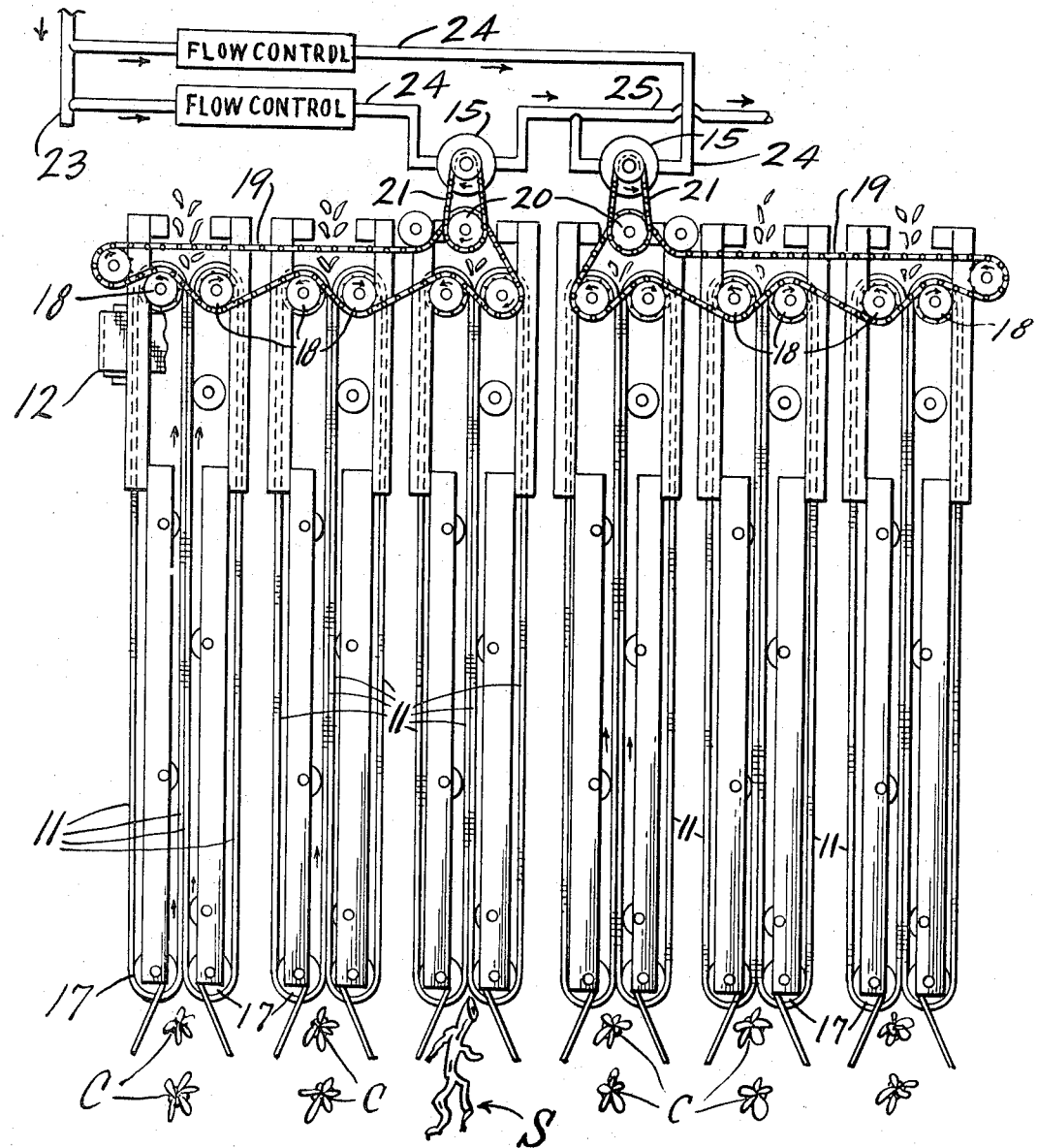
FIG-2-

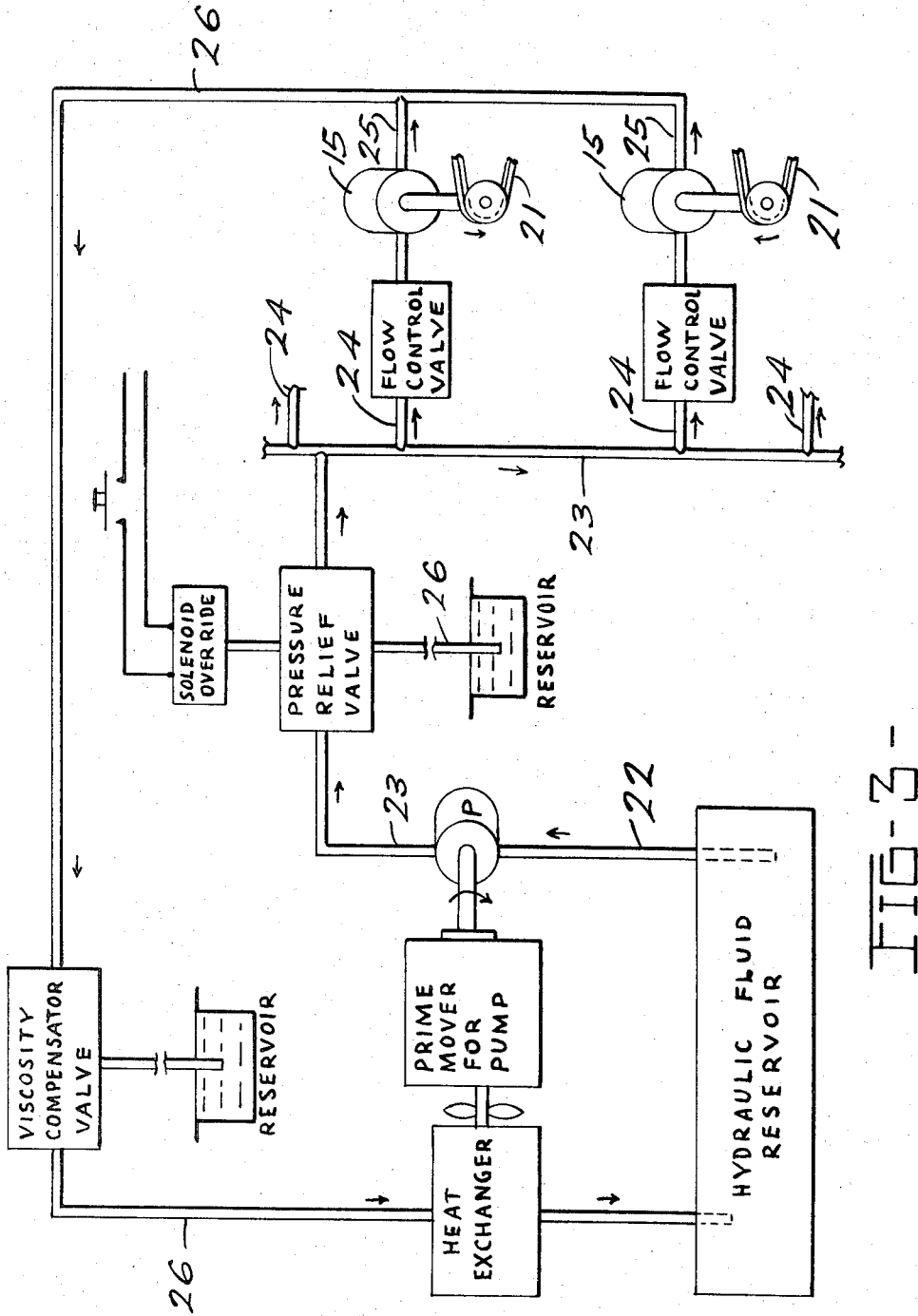

MULTIPLE ROW CROP HARVESTING MACHINE

BACKGROUND OF THE INVENTION

This invention relates to a harvesting machine for use in the simultaneous harvesting of a plurality of rows of crops planted in parallel, spaced-apart rows. More particularly, the invention relates to a harvesting machine whose individual harvesting mechanisms are driven and controlled by a source of hydraulic power supplied to hydraulic motors mechanically connected to the harvesting mechanisms.

Root crop (beets, radishes, etc.) harvesting machines having a plurality of multiple harvesting units for serially harvesting crops planted in spaced-apart, parallel rows are known in the art and are generally complex machines for grasping the tops of the crops, lifting the crops out of the ground, and elevating the crops to a position over a conveyor mechanism, at which position a topping device severs the root crop from the top, thus causing the root to drop upon the conveyor which conveys it to a remote station where it is loaded in a hopper. Such machines, such as that disclosed in U.S. Pat. Nos. 2,476,336, 2,833,357 and 2,833,358, may include a pair of parallel endless belts extending from the harvest area at ground level upwardly to the front of the machine, with one outer surface of the belts being adjacent the other and driven from the harvesting area upwardly toward the front of the machine so that, as the machine moves forward along the rows of crops, the tops of the crops are gripped between the belts and pulled upwardly so that the root crop is separated from the earth. As the root crop progresses upwardly along the belts, it passes a severing mechanism which cuts the root crop from the top which is gripped by the belts, allowing the root crop to drop to the conveyor. The top of the crop, constituting unwanted leaves, continues past the conveyor and is dropped to the ground.

One of the difficulties encountered with such harvesting machines of the prior art is that frequently, when in operation, foreign objects, such as sticks, stones or other foreign material, are picked up by the harvesting mechanism and become wedged between the belts or lodged in the gears and associated parts used for driving the harvesting mechanism. When this happens, either the drive linkage breaks, the mechanism becomes misaligned, or another malfunction occurs which causes that particular mechanism to become inoperative, thus requiring repair of the machine before subsequent harvesting can be done. In addition, alignment problems of the drive train are encountered, particularly due to the fact that the machines are preferably designed with an adjustable spacing between the harvesting mechanisms to accommodate varied row spacing so that the machines can be used with various crops, such as radishes, beets, etc., or with the same crop having variable spacing due to variable conditions in weather, soil, etc. Finally, machines having a mechanical drive from a power source to the harvesting mechanisms require frequent lubrication, cleaning and have extensive moving parts which should be covered to protect the operator against possible injury.

SUMMARY OF THE INVENTION

It is an object of the present invention to provide a multiple row harvesting machine capable of the simultaneous harvesting of a plurality of rows of planted crops, which eliminates the above-enumerated problems attendant with prior art machines, and which eliminates the down time due to machine breakdown caused by foreign objects in the field. The harvesting mechanisms included in the harvesting machine of this invention are mechanically driven by hydraulic motors located close to the mechanism itself and whose output torque is directly proportional to the pressure of the hydraulic fluid being supplied thereto. Each of the hydraulic motors which may drive one or several of the plurality of harvesting mechanisms is connected with a source of hydraulic fluid under a predetermined constant pressure by hydraulic supply and return lines which form a closed hydraulic system. Positioned in the hydraulic supply lines between the source of constant pressure and the fluid motors is a pressure responsive relief or bypass valve which is effective to bypass fluid around the hydraulic motors when the fluid pressure in the fluid supply lines exceeds the predetermined constant operating pressure. Thus, each of the hydraulic motors is driven with a predetermined output torque which is proportional to the predetermined supply pressure from the hydraulic fluid pressure source or pump. If one of the harvesting mechanisms, such as the parallel belts in the described examples, encounters a foreign object such as a large stick or stone which becomes wedged between the belts and presents a resistance greater than the output torque of its associated motor, the resultant increased fluid pressure will open the bypass valve, thus bypassing fluid around the hydraulic motors, causing them to cease operation until the obstruction is removed. It will be thus apparent that such a system, if operated at a pressure so that the resulting output torque of the fluid motors is sufficient to drive the harvesting mechanisms under normal operation but insufficient to overcome obstructions which could cause damage to the parts, will effectively prevent such obstructions from causing misalignment or part breakage because the mechanism which is jammed or obstructed will merely stop operation until the obstruction is removed.

The basic system thus far described may be utilized in different ways. Firstly, a single bypass valve can be used in a common fluid supply line to control a plurality of hydraulic motors so that one malfunctioning harvesting mechanism will disable all of the other mechanisms. Secondly, each hydraulic motor may have its own bypass or relief valve so that malfunction of one will not disable the others. The selection of either of these systems is dependent upon the type of harvesting machine, the conditions under which it is used, and the type of crop being harvested. Finally, because all connection between the source of hydraulic pressure and the harvesting mechanism motors are through hydraulic lines which may be flexible, the alignment lubrication and maintenance problems present in mechanically-driven machines of the prior art are entirely eliminated. Other objects and advantages of the instant invention will be apparent to those skilled in the art from the following detailed description of a preferred embodiment thereof.

BRIEF DESCRIPTION OF THE DRAWINGS

FIG. 1 is a schematic view in elevation of a complete harvesting machine of this invention, showing the belt-type harvesting mechanisms attached to the front end of a wheeled chassis which has its own source of tractive power and generally showing the layout of the various components making up the harvesting machine;

FIG. 2 is a plan view of the harvesting mechanism attached to the front end of the machine illustrated in FIG. 1, and showing two groups of three pairs of harvesting belts, each of the groups being driven by a separate hydraulic motor as described;

FIG. 3 is a schematic diagram of the hydraulic drive and control system of this invention; and FIG. 4 is a schematic detailed view of the pressure relief valve and its override actuator which is shown in FIG. 3.

DETAILED DESCRIPTION OF A PREFERRED EMBODIMENT

Referring briefly to FIG. 1, the harvesting machine includes a wheeled chassis having a generally rectangular frame of a conventional nature upon which is mounted a tractive power source, such as a diesel engine, and the associated gears and controls for driving the machine over the ground. At the front end of the machine are mounted the plurality of harvesting mechanisms, generally designated by reference numeral 10 and which are shown in more detail in FIG. 2. Above the harvesting mechanisms 10 is a driver's control station which includes power and steering controls for the entire machine and remote controls for operating the harvesting mechanisms 10 and their power source.

The harvesting mechanisms 10 include a plurality of spaced-apart belts 11 which extend from the ground level in front of the machine upwardly to a position over a transverse conveyor 12 onto which the root bodies of the crops are dropped after they have been severed from the tops. The root bodies are then conveyed to the center of the machine where they are passed to a second conveyor 13 which extends beneath the machine and lengthwise under its chassis so that the crop roots are passed to the rear of the machine and thence on a third conveyor 14 which takes them to a remote position where they may be dumped in a separate hopper.

A hydraulic fluid pump driven by a separate power source, such as a second diesel engine, is mounted toward the rear of the chassis above a hydraulic fluid reservoir. The interconnecting fluid supply and return lines between the reservoir, pump and several fluid motors 15 which drive the harvesting mechanisms are carried on the chassis but are not shown in FIG. 1. As is the case with prior art machines, the harvesting mechanisms or belts 11 may be raised and lowered from an operating position adjacent the ground to an upper position by means of a lift mechanism 16, the details of which will be known to those skilled in the art and which do not form a part of this invention.

Referring to FIG. 2, each of the harvesting mechanisms 10 includes a pair of adjacent endless belts 11 which extend around lower guide wheels or pulleys 17 and upper guide wheels or pulleys 18. Three pairs of the belts 11 are driven by a driver chain 19 which extends around sprockets secured to the upper wheels 18 and an idler sprocket 20 which is, in turn, connected by a chain 21 to a chain sprocket secured to the shaft of a fluid motor 15. Thus, it will be seen that as the fluid motors 15 turn in the direction of the small arrows shown in FIG. 2, the drive chains 19 turn the upper wheels 18 in the direction shown so that the belts 11 are driven in the direction of the arrows as indicated so that the adjacent edges between each pair of belts 11 move upwardly from the lower wheels 17 toward the upper wheels 18. As the machine moves along the rows of crops, the plants or crops, designated by reference numeral C, are engaged between the belts 11 and are serially passed upwardly to the upper part of the harvesting mechanism.

At the upper part of the harvesting mechanism, as is schematically shown in FIG. 1, a topping device similar to that shown in U.S. Pat. No. 2,476,336 is provided which gradually pulls the roots of the crops away from the belts as they pass toward the top of the mechanism and severs the roots from the tops, allowing the roots to drop into the transverse conveyor 12. The tops continue passing between the belts 11 to the end of their run and drop to the ground.

The hydraulic drive and control system for the harvesting mechanisms briefly described above is schematically illustrated in FIG. 3, which shows two fluid motors 15 and their hydraulic connections with the source of hydraulic pressure or pump P. As illustrated, the pump P is mechanically connected to a prime mover, such as a diesel engine, and is supplied with hydraulic fluid from a hydraulic reservoir through a line 22. The output of the pump is supplied to the motors 15 by a hydraulic supply line 23 through a pressure relief valve which includes a selectively operated override switch which will be subsequently described in detail. Each of the branch supply lines 24 extending from the common supply line 23 are connected through a flow control valve to the hydraulic motors 15, and hydraulic return lines 25 from each of the motors 15 connect to a common return line 26 which passes through a heat exchanger to the hydraulic fluid reservoir.

As previously pointed out, each of the hydraulic motors 15 has an output torque proportional to the pressure of the hydraulic fluid supplied thereto, and has an output speed proportional to the fluid flow rate (gallons per minute) through the motor. Each of the motors 15 is connected with a flow control valve which may be used to adjust the motor speed to the proper value so that the belts of the harvesting mechanisms are driven at precisely the same speed and at a speed desirable for harvesting the crops at a given ground speed for the entire harvesting machine along the rows. At a given predetermined output pressure from the pump P, each of the motors 15, with the flow control valves properly adjusted, will operate at the same speed and at a predetermined output torque sufficient to drive the harvesting mechanisms under normal operation but insufficient to overcome obstacles in the mechanisms which might cause damage thereto. When such an obstacle is encountered, such as a large stick S shown in FIG. 2, pressure builds up in the supply lines 24 and 23, causing the pressure responsive bypass valve to open and bypass fluid through the dump line 26, which effectively stops all of the motors 15 until the obstruction S is removed.

FIG. 4 is a detailed schematic view of an embodiment of the pressure relief valve and its selectively operated override switch. Pump pressure from the common supply line 23 is applied to the right-hand chamber of the relief valve 27 which has a poppet held closed by a spring 28 whose spring constant is selected to provide the proper operating pressure. The construction of such valves is well known to those skilled in the art and commercially available models are provided with adjustable features so that the optimum desired operating pressure may be selected. When the hydraulic fluid pressure in the line 23 exceeds the predetermined operating pressure, the poppet valve is moved to the left against the spring 8 28, and fluid is bypassed through the branch line 29, through the valve body 27 and into the fluid reservoir. If the pressure drops below the predetermined pressure, the valve is closed by the spring 28 and operation resumes. However, if an obstruction remains in one of the harvesting mechanisms so that its associated fluid motor 15 is stopped, the pressure in the line 23 will remain above the predetermined pressure, thus holding the valve open until the obstruction is removed.

A simple override mechanism is schematically illustrated in FIG. 4 as comprising a fluid cylinder 30 which, when moved to the left, will open the pressure relief valve 27. Fluid pressure to open the valve is supplied from the supply line 23 through a branch line 31 which is separated from the fluid cylinder 30 by a normally open valve 32 operated by an electrically controlled solenoid 33. When the operator desires to stop the harvesting mechanisms, he completes the electrical circuit to the solenoid 33, as by means of a switch remotely located at the operator's station, to close the normally open valve 32 which admits fluid pressure from the line 31 to the cylinder 30 which causes the fluid relief valve 27 to open, thus bypassing fluid flow around the fluid motors 15.

Finally, as shown schematically in FIG. 3, a heat exchanger for the hydraulic fluid is provided in the return line 26 along with a viscosity compensator, which may be a pressure relief valve, to bypass the heat exchanger when the oil is cold.

Hydraulic motors of the type described for use in this invention which have an output torque directly proportional to the pressure of the hydraulic fluid supplied thereto are available commercially from a number of sources including the Charlynn Company of Eden Prairie, Minn. 55345, whose fluid motors are described in U.S. RE Pat. No. 25,291. Hydraulic pumps of the type required in this invention are also available from a number of sources including the Vickers Division of Sperry-Rand Corporation, Troy, Mich. 48084, whose "Series 50V" pumps are suitable for this purpose. Other individual components of the system are conventional and available from a number of commercial sources.

It is to be understood that the invention herein may be utilized in connection with many types of harvesting equipment in which a plurality of separate harvesting mechanisms are driven by a single motive source in which the simultaneous operation of such mechanisms remote from the power source is required. The advantages of remote control and of a control system responsive to obstructions which may be picked up in the harvesting apparatus are applicable to many types of machines and are not limited to the particular topping machine described. It is also to be understood that various modifications of the described apparatus may be made by those skilled in the art without departing from the scope and spirit of the attached claims.

We claim:

1. A power drive and control system for a harvesting machine having a plurality of separate, spaced-apart harvesting mechanisms for the simultaneous harvesting of a plurality of spaced-apart rows of crops comprising, in combination:

a plurality of hydraulic motors operably connected to said separate harvesting mechanisms whereby each motor will mechanically drive at least one such separate mechanism independently of the other such mechanisms, each of said hydraulic motors having an output torque directly proportional to the pressure of the hydraulic fluid supplied thereto;

a common source of hydraulic fluid under a predetermined constant pressure;

a hydraulic fluid supply line and return lines interconnecting said constant pressure fluid source and said motors to provide a closed hydraulic system whereby all of said motors and the harvesting mechanisms associated therewith are driven under predetermined constant torque by fluid under said predetermined constant pressure from said common source;

a pressure responsive bypass valve positioned in the hydraulic supply line between said common pressure source and said motors and adapted to bypass fluid around said motors when the pressure in said supply line exceeds said predetermined constant pressure whereby;

when any one of said harvesting mechanisms encounters a load exceeding such predetermined torque of its associated motor, said bypass valve will open in response to increased pressure in said fluid supply line to effectively stop all such motors and their associated harvesting mechanisms.

2. The system of claim 1 which further includes a bypass valve override mechanism to selectively open said bypass valve to effectively stop all hydraulic motors and means for remotely actuating and deactuating said override mechanism.

3. The system of claim 1 wherein said bypass valve includes a spring responsive to fluid pressure and effective to hold closed said bypass valve when said hydraulic pressure is below such predetermined value, and a selectively operable override mechanism effective to open said bypass valve regardless of hydraulic pressure thereon.

4. A harvesting machine for the simultaneous harvesting of a plurality of parallel rows of crops comprising, in combination:

a wheeled chassis with power means for driving and means for guiding said wheeled chassis along said parallel crop rows;

a plurality of separate harvesting mechanisms secured to said chassis and positionable in close proximity to the ground for contact with said rows of crops, said harvesting mechanisms spaced apart a distance equal to the crop row spacing whereby each of said crop rows may be harvested by a separate harvesting mechanism;

a plurality of hydraulic fluid motors mechanically connected to said harvesting mechanisms whereby each hydraulic motor drives at least one such separate harvesting mechanism, each of said hydraulic motors having an output torque directly proportional to the pressure of the hydraulic fluid supplied thereto;

a common source of hydraulic fluid under a predetermined constant pressure;

a hydraulic fluid supply line and return lines interconnecting said constant pressure source and said plurality of hydraulic motors to provide a closed hydraulic system whereby all of said motors and the harvesting mechanisms connected therewith are driven at a predetermined constant torque by hydraulic fluid under said predetermined constant pressure from said common source; and a pressure responsive bypass valve positioned in the hydraulic supply line between said common constant pressure source and said hydraulic motors and adapted to bypass fluid around said motors when the pressure in said supply line exceeds said predetermined constant pressure whereby;

when any one of said harvesting mechanisms encounters a load exceeding said predetermined torque of its associated motor, said bypass valve will open in response to increased hydraulic fluid pressure in the fluid supply line to effectively stop all such motors and their associated harvesting mechanisms.

5. The harvesting machine of claim 4 wherein said source of hydraulic fluid pressure is a hydraulic pump driven by a power source independent of the power means for driving said wheeled chassis.

6. The harvesting machine of claim 4 which includes an override mechanism to selectively open said bypass valve to effectively stop all hydraulic motors and means for remotely actuating and deactuating said override mechanism.

7. The harvesting machine of claim 4 wherein each of said harvesting mechanisms includes a pair of endless belts driven about spaced-apart guide wheels and extending from a position in front of said machine adjacent the ground upwardly toward said machine, with the outer surface of one belt of the pair closely adjacent the outer surface of the other belt of the pair, means mechanically connecting said hydraulic motors and said spaced-apart guide wheels to drive said belts about said wheels with the adjacent outer surfaces moving together upwardly from the ground toward said machine whereby the exposed tops of crops in crop rows harvested by said machine are serially engaged between said adjacent outer surfaces at ground level and are moved upwardly by said belts toward said machine.

8. The harvesting machine of claim 4 which further includes at least one conveyor positioned beneath said wheeled chassis and extending from said harvesting mechanisms upwardly toward the rear of said machine and adapted to convey crops from said harvesting mechanisms to an upward loading position, hydraulic conveyor motors mechanically connected to said conveyor, and hydraulic fluid supply and return lines interconnecting said source of pressure and said conveyor motors.

9. A method of driving and controlling a plurality of harvesting mechanisms associated on a common chassis with each harvesting mechanism driven by a hydraulic fluid motor having a predetermined output torque in proportion to the pressure of the hydraulic fluid supplied thereto comprising the steps of applying hydraulic fluid under a predetermined pressure to each of said motors, said fluid pressure being supplied through a closed hydraulic system having a common hydraulic fluid supply line and return lines interconnecting said motors and a constant pressure source, and a pressure responsive bypass valve in said common supply line effective to bypass fluid flow to said motors when pressure in said supply line exceeds said predetermined pressure due to an obstruction encountered by one of said harvesting mechanisms which exceeds said predetermined output torque of its associated hydraulic fluid motor.